(12) United States Patent
Lauber et al.

(10) Patent No.: US 9,285,254 B2
(45) Date of Patent: Mar. 15, 2016

(54) FLOWMETER

(71) Applicant: DIGMESA AG, Ipsach (CH)

(72) Inventors: Stefan Lauber, Biel (CH); Stefan Schneider, Konolfingen (CH); Martin Sigrist, Bern (CH); Christoph Rusch, Nidau (CH); Jean-Claude Frely, Biel (CH)

(73) Assignee: DIGMESA AG, Ipsach (CH)

( * ) Notice: Subject to any disclaimer, the term of this patent is extended or adjusted under 35 U.S.C. 154(b) by 0 days.

(21) Appl. No.: 14/411,864

(22) PCT Filed: Jul. 1, 2013

(86) PCT No.: PCT/EP2013/063844
§ 371 (c)(1),
(2) Date: Dec. 29, 2014

(87) PCT Pub. No.: WO2014/006001
PCT Pub. Date: Jan. 9, 2014

(65) Prior Publication Data
US 2015/0135851 A1    May 21, 2015

(30) Foreign Application Priority Data
Jul. 2, 2012   (EP) .................................... 12174615

(51) Int. Cl.
*G01F 1/075*   (2006.01)
*G01F 1/115*   (2006.01)
(Continued)

(52) U.S. Cl.
CPC .............. *G01F 1/115* (2013.01); *G01F 1/075* (2013.01); *G01F 15/14* (2013.01); *G01F 15/185* (2013.01)

(58) Field of Classification Search
USPC ...................................................... 73/861.77
See application file for complete search history.

(56) References Cited

U.S. PATENT DOCUMENTS

| 6,730,927 B1 * | 5/2004 | Smith | ....................... G01F 1/20 |
| | | | 128/204.22 |
| 2006/0162725 A1 * | 7/2006 | Downie | ............... G05D 7/0635 |
| | | | 128/203.12 |

FOREIGN PATENT DOCUMENTS

| CA | 2037993 A1 | 9/1991 |
| CH | EP 2166316 A1 * | 3/2010 .............. G01F 1/075 |

(Continued)

OTHER PUBLICATIONS

International Preliminary Report on Patentability and Translation of the Written Opinion of the International Searching Authority (Forms PCT/IB/373 and PCT/ISA/237), dated Jan. 6, 2015, for International Application No. PCT/EP2013/063844.

(Continued)

*Primary Examiner* — Lisa Caputo
*Assistant Examiner* — Jamel Williams
(74) *Attorney, Agent, or Firm* — Birch, Stewart, Kolasch & Birch, LLP (57) ABSTRACT

A flowmeter for liquids has a measuring housing, which encloses and rotatably mounts an impeller, said measuring housing comprising a one-piece supply pipe and discharge pipe, wherein the impeller is eccentrically arranged in the discharge pipe after a nozzle-forming constriction. A sensor encoder is associated with the impeller and a sensor which responds to the sensor encoder is provided on the measuring housing for determining the amount of liquid flowing through the measuring housing on the basis of the revolutions of the impeller. The outer diameter corresponding to the impeller is smaller than the nominal inner diameter of the discharge pipe, enabling it to be pushed into the one-piece pipe.

13 Claims, 7 Drawing Sheets

(51) Int. Cl.
*G01F 15/14* (2006.01)
*G01F 15/18* (2006.01)

(56) References Cited

FOREIGN PATENT DOCUMENTS

| CH | WO 2010149601 | A1 | * | 12/2010 | | G01F 15/006 |
|---|---|---|---|---|---|---|
| DE | 10249566 | A1 | | 5/2004 | | |
| EP | 0447811 | A1 | | 9/1991 | | |
| EP | 2154490 | A1 | | 2/2010 | | |
| EP | 2166316 | A1 | | 3/2010 | | |
| EP | 2166316 | A1 | * | 3/2010 | | G01F 1/075 |
| FR | 2428827 | A1 | | 1/1980 | | |
| GB | 2382661 | A | | 6/2003 | | |
| IL | WO 2011055362 | A1 | * | 5/2011 | | G01F 1/075 |
| WO | WO 2010/149601 | A1 | | 12/2010 | | |
| WO | WO 2010149601 | A1 | * | 12/2010 | | G01F 15/00 |
| WO | WO 2011/055362 | A1 | | 5/2011 | | |
| WO | WO 2011055362 | A1 | * | 5/2011 | | |

OTHER PUBLICATIONS

International Search Report for PCT/EP2013/063844 mailed on Oct. 8, 2013.
Written Opinion of the International Searching Authority for PCT/EP2013/063844 mailed on Oct. 8, 2013.

* cited by examiner

FLOWMETER

TECHNICAL FIELD

The present invention relates to a flowmeter for liquids, having a measuring housing which encloses and rotatably mounts an impeller, a supply pipe, a discharge pipe, at least one sensor encoder which is assigned to the impeller, and a sensor which is provided on the measuring housing and responds to the sensor encoder and has the purpose of determining the amount of liquid flowing through the measuring housing on the basis of the revolutions of the impeller.

PRIOR ART

A flowmeter having a number of features of the type mentioned at the beginning is known from GB 2,382,661. This patent application uses a sensor for detecting the Hall effect with a corresponding magnet which is assigned to the impeller. In this context, this magnet is, in particular in contrast with older models, removed from the path of the liquid since such an arrangement has, according to the information in this document, a negative influence on the device as such and makes it difficult to replace the magnets.

In GB 2 382 661 the magnet is arranged outside the course of the liquid.

In EP 2 166 316, which is based on this British document as prior art, an inflow connector, which is integrally molded onto the measuring housing, is used to enclose therein as an additional element a nozzle pipe which forms a nozzle duct.

Although the cited documents operate satisfactorily on the basis of the measuring principle of the Hall effect, they are less suitable in their dimensions for applications with very restricted space as a result of the cylindrical measuring housing with an integrally molded-on connector.

A flowmeter having the features of the type mentioned at the beginning is known from EP 2 154 490. Here, the measuring housing is a pipe which surrounds the supply pipe and the discharge pipe in one piece and in which a nozzle-forming constriction is arranged eccentrically between the supply pipe and the discharge pipe. The impeller is rotatably mounted in the discharge pipe which is widened for the measuring housing, wherein the impeller is approximately twice as big as the diameter of the supply pipe and discharge pipe. A constriction of the one-piece pipe is provided centrally. The disadvantage of this prior art is therefore, inter alia, that the space required for the measuring housing which projects over the outer diameter of the pipe composed of supply pipe and discharge pipe is large and therefore the circular dimension determined by the cross section composed of supply pipe and/or discharge pipe projects out.

Similar flowmeters are known from WO2011/055362 A1 and FR2 428 827 A1.

SUMMARY OF THE INVENTION

Taking this prior art as a starting point, the invention is based on the object of configuring a flowmeter of the type mentioned at the beginning to be smaller and to be capable of being more easily positioned. In particular, an object of the invention is to specify a space-saving flowmeter which can easily be installed in the lines of a hot beverage or cold beverage preparation device. In this context a further object of the present invention is to connect the necessary electrical and electronic systems as a control unit in a compact fashion and without requiring additional space, for example by clipping on the measuring housing pipe with this control unit.

A further object of the present invention is to simplify the assembly of the flowmeter and to use fewer parts.

These objects are achieved according to the invention for a flowmeter of the type mentioned at the beginning having, inter alia, the features of claim 1, in which the flowmeter for liquids has a measuring housing which encloses and rotatably mounts an impeller, in which the measuring housing itself is composed of a supply pipe and a discharge pipe. In this context, at least one sensor encoder which is assigned to the impeller and a sensor which is provided on the measuring housing and responds to the sensor encoder and has the purpose of determining the amount of liquid flowing through the measuring housing on the basis of the revolutions of the impeller are provided. The measuring housing is a pipe which comprises the supply pipe and the discharge pipe in one piece and in which a nozzle-forming constriction is arranged eccentrically between the supply pipe and the discharge pipe. The impeller is rotatably mounted in the discharge pipe downstream of the nozzle-forming constriction. In this context, the outer diameter corresponding to the impeller is smaller than the nominal inner diameter of the discharge pipe.

The sensor is advantageously a Hall sensor.

The impeller advantageously has, in the plan view in the axial pipe direction an outer face in each rotational position, such that the impeller fits into the free space provided by the inner pipe, wherein the impeller has two side walls, on each of which a bearing element is provided axially in the center, said bearing element being assigned to a rotary bearing which is assigned to the discharge pipe. The axis of the rotary bearing is perpendicular to the longitudinal axis of the pipe, and the sensor is advantageously attached perpendicularly with respect to the two specified axes above or below the pipe.

The bearing is advantageously composed of in each case a bearing cone at the ends of the rotational axis, which bearing cones engage in corresponding openings as a rotary bearing in or in front of the wall of the discharge pipe.

The flowmeter can be provided with a bearing cage, for which purpose at least two attachment elements, for example guide fins, are provided in the discharge pipe, onto which guide fins the bearing cage for the impeller can be fitted. These elements serve as guide elements or positioning elements and protect the cage against rotation and serve likewise to position it. This bearing cage is advantageously secured in its axial position by means of ratchet pawls.

The bearing cage can be composed of a ring on which bearing arms which lie opposite one another are integrally formed, said bearing arms protruding essentially at a right angle from the ring. Deviation from the right angle can be dependent, in particular, on the tightening of the injection mold. The bearings can be provided in these bearing arms. The bearing arms are advantageously pushed forward in the direction of the constriction, with the result that the ring is arranged downstream. In principle, the bearing is also possible in the opposite direction, but the first-mentioned solution is preferred.

The impeller can have three or four blades. The number is basically not restricted; there can therefore be four, six, eight, nine, ten blades or some other number of blades. In this context, the impeller can be an injection molded part, wherein it is composed of a permanently magnetic injection molded plastic, at least in one blade. This can be achieved by means of 2 k injection molding material. The entire impeller can also be formed from the permanently magnetic injection molded plastic since the changes in the magnetic field are determined by the blades which are remote from the axis.

In another embodiment, the impeller can be an injection molded part, wherein at least one blade has a permanent magnet which is at least partially enclosed by injection molding.

As a result, the flowmeter is arranged completely in the essentially tubular measuring housing and therefore the measuring housing is a "measuring pipe", no additional space is required for the connection of the switching unit and the measuring housing pipe in a hot beverage or cold beverage preparation device since said measuring pipe can easily be inserted into a corresponding compatible switching unit which has releasable or non-releasable latching elements, such as a hose or pipe into a pipe clip.

Further embodiments are given in the dependent claims.

BRIEF DESCRIPTION OF THE DRAWINGS

Preferred embodiments of the invention are described below with reference to the drawings which are merely for the sake of explanation and are not to be interpreted as being restrictive. In the drawings.

DESCRIPTION OF PREFERRED EMBODIMENTS

Figure 1:
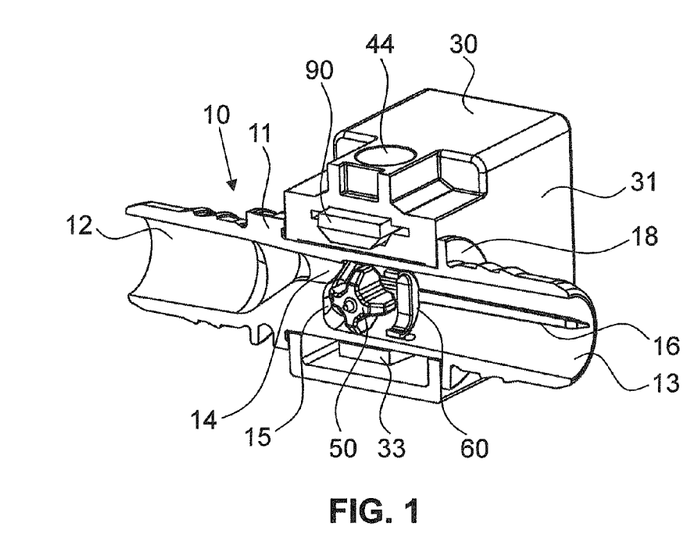
FIG. 1 shows a partially cut-away perspective view of a flowmeter according to an exemplary embodiment of the invention.

FIG. 1 shows a partially cut-away perspective view of a flowmeter according to an exemplary embodiment of the invention. A measuring housing 10 is fitted with its discharge pipe 11 into a sensor housing 30, as will be explained in more detail below. The measuring housing 10 is tubular and is not damaged in any way, which means that it has only two pipe openings 12 and 13. The supply pipe is denoted by the reference number 12, and the discharge pipe is denoted by the reference number 13 opposite.

Figure 2:
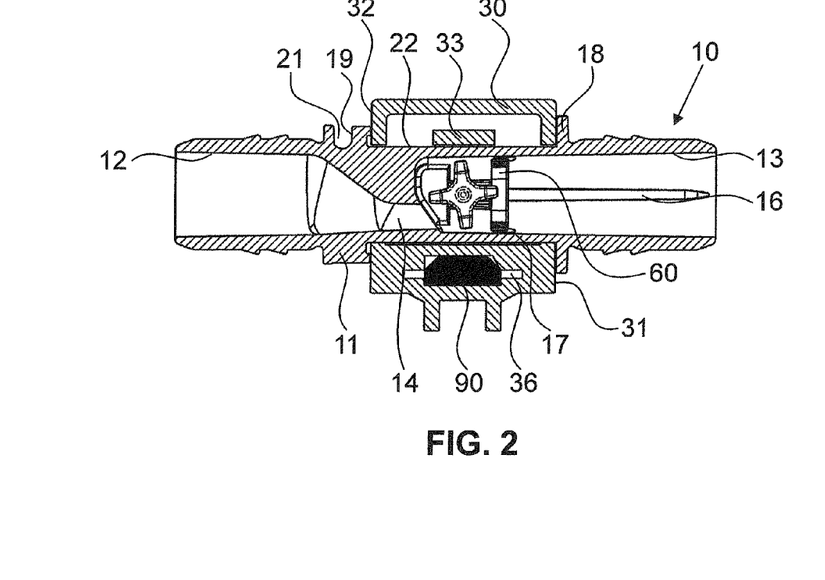
FIG. 2 shows a sectional view of the section in FIG. 1.

From the sectional view in FIG. 2 of the section in FIG. 1 it can be seen that the discharge pipe 11 has a flange 18, opposite which an opposing flange 19 is arranged, which opposing flange is fitted in between the outer walls 31 and 32 of the sensor housing. The orientation of the throughflow direction is ensured by the orientation groove 21 on the other side of the opposing flange. The orientation of the pipe 11 in the circumferential direction will be described later in relation to FIG. 10.

The supply pipe 12 and also the discharge pipe 13 have a predetermined inner diameter which is preferably of the same size, for example 4.1 millimeters in the case of an outer diameter of the pipe 11 of 6 millimeters and a length of the same of approximately 3.3 centimeters. Of course, and as already apparent from the approximate data, other sizes are also conceivable depending on the throughflow amount required. The supply pipe 12 constricts to a constriction 14 which acts as a nozzle and which is arranged radially offset with respect to the longitudinal axis of the measuring housing 10. The longitudinal axis is located in the plane of the drawing in FIG. 2 at the level of the positioning fin 16 which will be described later. The constriction 14 is reached via two junction faces which have a curve and between which an asymmetrical cone is arranged. The constriction 14 has a diameter which is preferably in the range between 20% and 40% of the nominal diameter of the supply pipe 12, and in the case of an exemplary embodiment of the type mentioned above this is, for example, 1.33 millimeters. The constriction 14 is arranged in such a way that it does not contain the longitudinal axis of the inner pipe. At the same time, it is provided with a small step 24 (see FIG. 6 or 7) with respect to the rear wall 15 in the region of the discharge pipe 13, with the result that the direction of the jet impinges on an impeller or turbine 50 which is fitted into the measuring housing 10. The corresponding impact face 54 is denoted in the perspective view of the impeller 50 in FIGS. 3 and 4. This step 24 can also be omitted in other exemplary embodiments which are not shown in the figures.

In FIG. 1, the measuring housing 10 is fitted into a recess 35 in the sensor housing 30. The sensor housing 30 without the measuring housing 10 is illustrated in greater detail in FIGS. 8 and 9; the measuring housing 10 without the sensor housing 30 is illustrated in greater detail in FIG. 10.

The bearing of the measuring housing 10 in the sensor housing 30 in the axial direction is ensured by the flanges 18 and 19, which bear against the side walls 31 and 32 of the sensor housing from the outside. From the lower side a tongue 33 is provided in the sensor housing 30, which tongue engages behind a corresponding fin in the outer pipe 11 and therefore leaves the measuring housing 10 and the sensor housing 30 in two different parts, which ensures the division of the course of the liquid from the sensor 90. The sensor 90 is a Hall sensor, which is arranged in the radial extension of the axis of the vertical impeller 50. In the illustrated exemplary embodiment, said sensor 90 is fitted into a corresponding slot 36 in the sensor housing 30 and is preferably sealed with an insulating silicone. For this purpose, a connecting opening 44 is provided on the upper side of the sensor housing 30, through which connecting opening 44 this insulating material can be injection molded into the cavity which accommodates the sensor 90.

The sectional drawing in FIG. 2 illustrates a positioning fin 16 in the pipe on the discharge side 13, which positioning fin 16 is provided from almost the end of the discharge pipe 13 as far as the region of the axis of the impeller. In the illustrated exemplary embodiment here there are two fins 16 which are arranged on both sides of the discharge pipe 16 at an angle of 180° with respect to one another. In other exemplary embodiments, there can also be three fins 16 with an angular spacing of 120° or four fins with a spacing of 90°.

There are then four ratchet pawls 17 associated with the two fins 16, said ratchet pawls 17 being arranged in pairs at a small angle of 40° with respect to one another.

Figure 5:
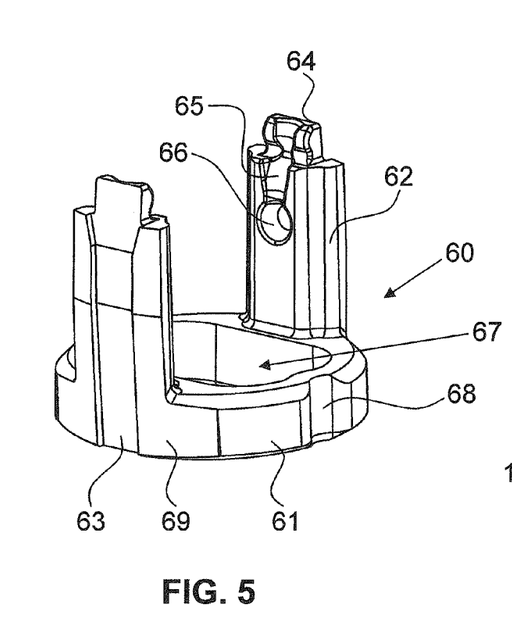
FIG. 5 shows a bearing cage for an impeller according to FIG. 3 or 4 for a flowmeter according to FIG. 1.

The fins 16 are provided to interact with the bearing arm grooves 63 of the bearing cage 60, which is illustrated in more detail in FIG. 5. The bearing cage 60 is fitted into the outer pipe 11 from the discharge pipe side 13 until it comes to rest behind the ratchet pawl 17. In the exemplary embodiment illustrated here, two ratchet pawls 17 are injection molded in the discharge pipe 13 as a bump and are at an angle of 90° with respect to the positioning fin 16. In the case of three positioning fins with an angular spacing of 120°, for example three catches 17 can be provided with an angular spacing of 60° with respect to the fins 16. The positioning fins 16 can also have a bump or form an elevation, which becomes ever smaller, over the inner diameter, with the result that they can also assume the securing function for the cage 60.

The exemplary bearing cage 60 which is illustrated in FIG. 5 has a ring 61 whose outer wall 69 has a diameter which fits into the inner diameter of the discharge pipe 13. Two bearing arms 62 which lie opposite one another are injection molded in one piece onto the ring 61, said bearing arms 62 having the abovementioned bearing arm grooves 63 on their outer side and ending in a run-up projection 64 at which there is only the groove 63 and there are no longer any guiding side walls. The bearing arms are of such a length that they advantageously either abut against the end wall of the constriction 14 in the discharge pipe 13 and therefore ensure the axial position of the bearing cage 60 with respect to the catches 17, or that they abut against a wall which correspondingly protrudes from the constriction 14 as a stop.

Bearing openings 66 which are lower than the guide grooves 65 leading to them are provided on the inside of the bearing arms 62, at locations lying opposite one another. These guide grooves 65 permit the impeller 50 to be fitted in by the run-up projection 64, for example according to FIG. 3 or 4.

Figure 3:
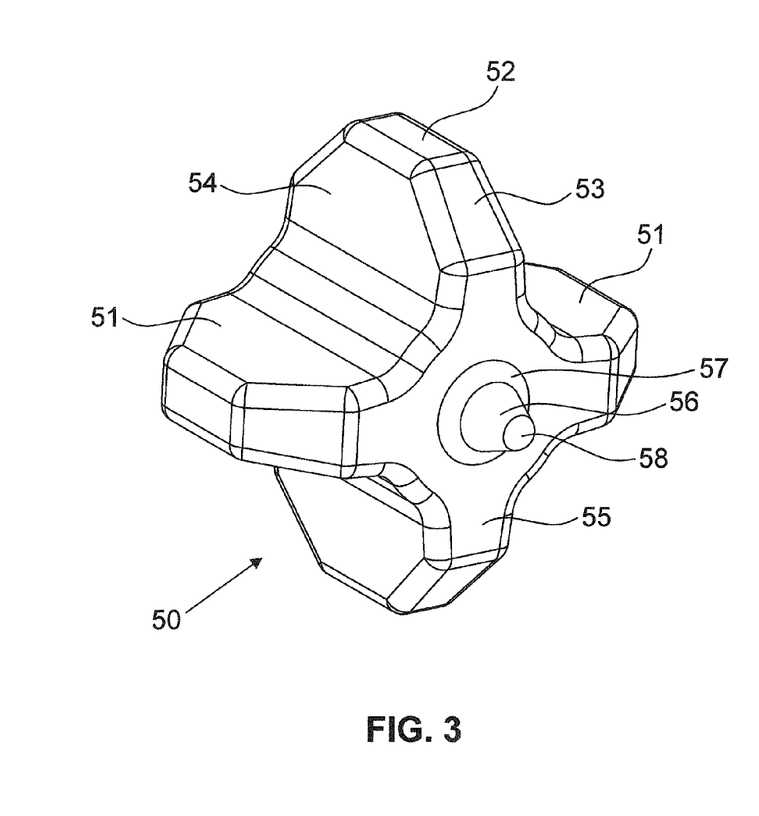
FIG. 3 shows a perspective view of an impeller according to the exemplary embodiment in FIG. 1.

FIG. 3 shows a perspective view of an impeller 50 according to the exemplary embodiment in FIG. 1. The impeller 50 has four blades 51 which are each configured as a trapezium in the front view. They therefore have an outer face 52 which is adjoined on both sides by an beveled face 53, with the result that the impeller fits into the free space predefined by the inner pipe. Two side walls 55 are provided laterally, and rising from said side walls in the center is a bearing cone 56 which starts from a widened cone base. The termination of the bearing cone 56 is a rounded cone tip.

The impeller 50 according to FIG. 3 therefore has four impact faces 54.

In principle it would also be possible to provide a three-bladed impeller 50. Impellers with two blades have fewer preferred properties as an embodiment. Impellers with four and more blades are further alternative embodiments.

The impeller 50 according to FIG. 3 is an injection molded part composed of a magnet embedded in plastic, such as the material HF14/22 from Schrammberg (MS-Schrammberg GmbH & Co. KG in DE-870713 Schrammberg-Sulgen). Another magnetic material which is embedded by injection molding and can be processed using an injection molding method is the Cleablent product from Barloc Plastics GmbH from DE-51766 Engelskirchen, wherein the material comprises ferrite-filled compounds based on a wide variety of different thermoplastics for manufacturing magnetic functional parts.

Figure 4:
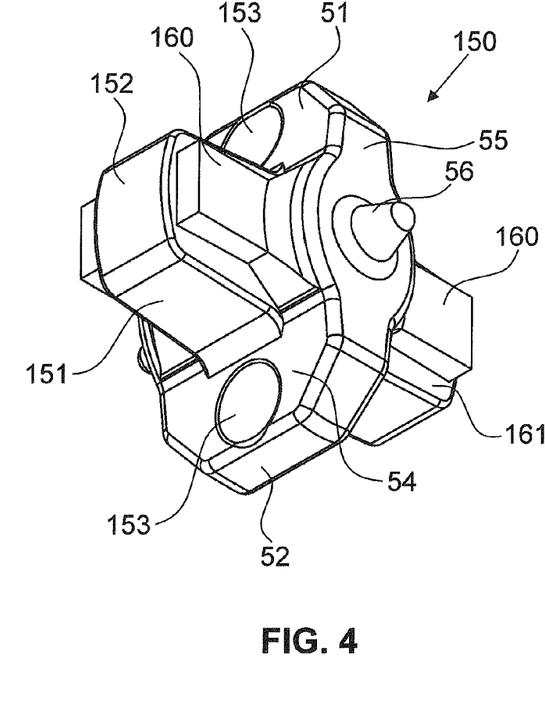
FIG. 4 shows a perspective view of an alternative impeller for an exemplary embodiment according to FIG. 1.

In another exemplary embodiment according to FIG. 4, an alternative impeller 150 is illustrated. Identical features are characterized in all the figures in each case with the same reference symbols, and similar features are characterized by similar reference symbols. The impeller 150 also has four blades 51 and impact faces 54, wherein such an impact face has a cast-on depression 153 here. For reasons of symmetry, two cast-on depressions 153 are provided on the faces lying opposite one another on each blade 51, that is to say twice.

The bearing cone 56 with its rounded tip is configured in the same way as the exemplary embodiment according to FIG. 3; however, the plastic which is used for the impeller here is a customary non-magnetic injection molded plastic. The magnetic components which are necessary to operate the Hall sensor are implemented by magnets 160, inserted in the injection molding, in two further blades. These further blades 151 therefore have walls 161 which are enclosed by injection molding laterally around the magnets 160, while the outer face 152 corresponds in principle to the face 52 of the other blades 51.

Both types of impellers 50 or 150 can be inserted into the cage 60 and the latter is subsequently pushed forward behind the catches 17.

Instead of the cone 56 and the bearing opening 66, this bearing can also be implemented in an inverted fashion, in particular when a bearing cage 60 is used, that is to say that the openings are provided in the side walls 55 and the cones are implemented as elevated portions instead of the openings 66 in the side arms 62. It is also possible to have a raised portion on one side of the turbine and a depression on the other.

Figure 6:
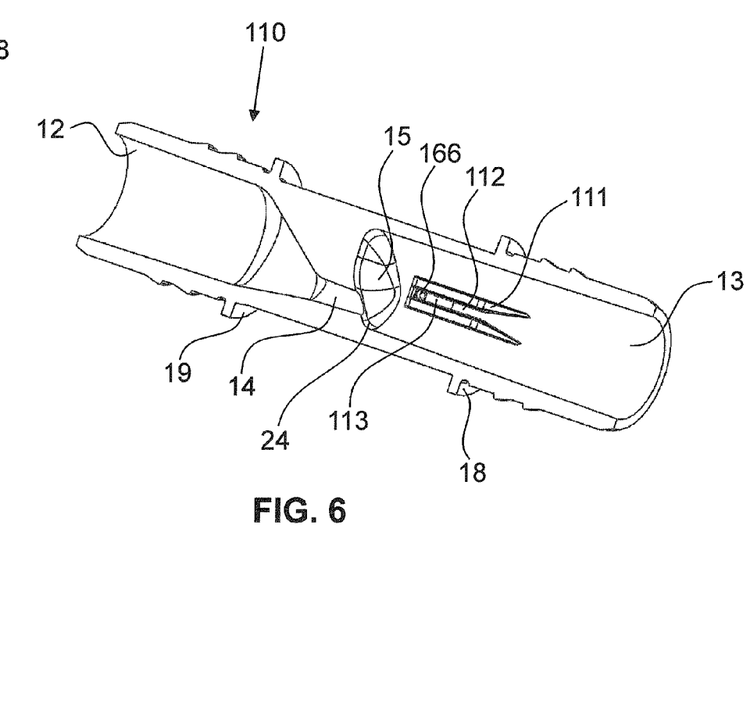
FIG. 6 shows a partially cut-away perspective view of an alternative pipe for a flowmeter according to a further exemplary embodiment of the invention.

In a further alternative exemplary embodiment according to FIG. 6, a partially cut-away perspective view of an alternative pipe 110 for a flowmeter according to a further exemplary embodiment of the invention is illustrated. The sensor housing 30 which has already been described above and is also illustrated in FIGS. 8 and 9 can be adopted without modification for this pipe 110 as a measuring housing, since the outer pipe 11 can be correspondingly provided with the flanges 18 and 19. The supply pipe 12 and the discharge pipe 13 with the constriction 14 as a nozzle between them are configured precisely as in the exemplary embodiment of the pipe 10 according to FIG. 1. The rear wall 15 of the constriction is also the same. The bearing openings 166 are also provided in the discharge pipe in the longitudinal direction, said bearing openings 166 being therefore located in the outer pipe 11, without, however, penetrating it. The dimensions of the cone 56 must then be somewhat longer in order to be suitable for direct use. The bearing cone 56 is then inserted with the correct orientation into the guide groove 112 between the guide fins 111, wherein it is pushed forward without a large amount of play in the direction of the bearing opening 166. In this context, it runs up onto a ramp 113, which reliably prevents the impeller 50 from slipping out after the bearing cone 56 slides into the bearing opening 166.

Figure 7:
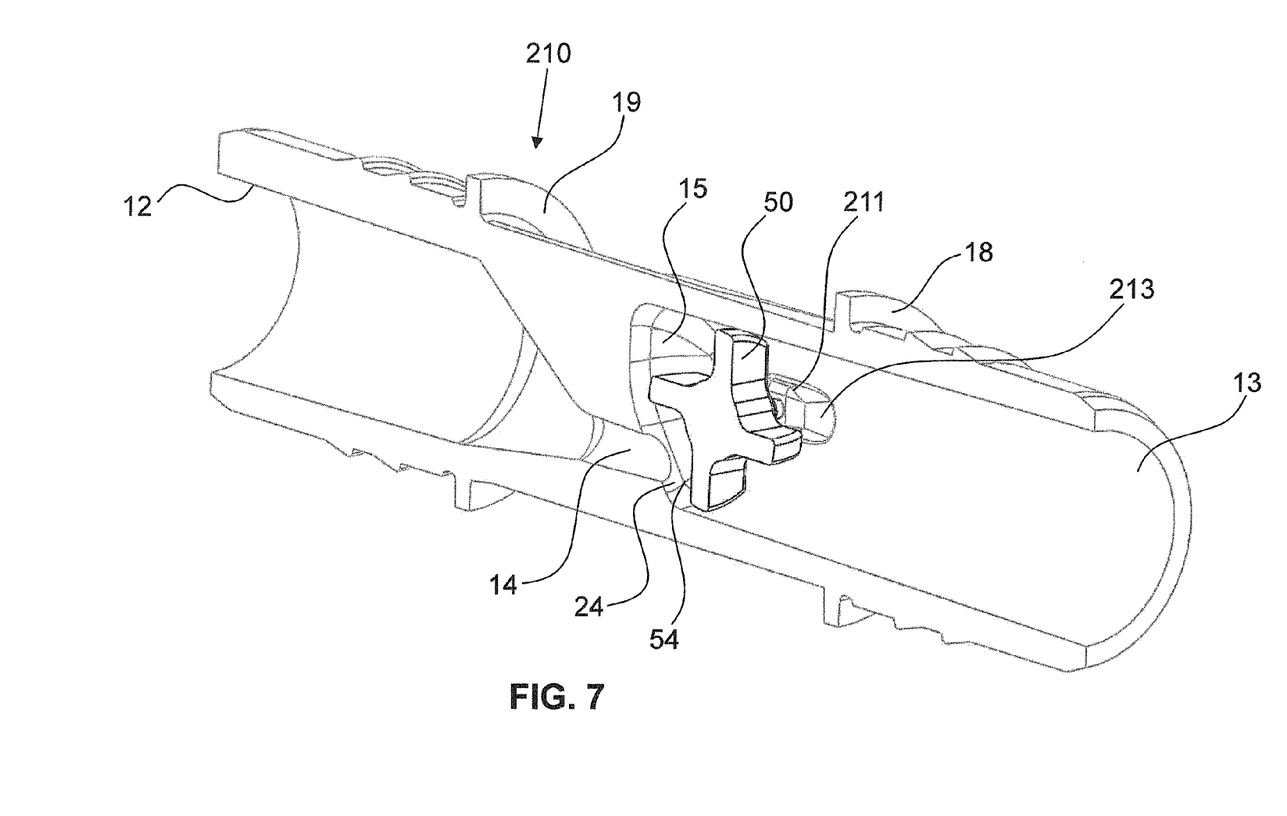
FIG. 7 shows a partially cut-away perspective view of an alternative pipe with an inserted impeller for a flowmeter according to a further exemplary embodiment of the invention.

FIG. 7 shows a partially cut-away perspective view of an alternative pipe 210 with an inserted impeller 50 for a flowmeter according to a further exemplary embodiment of the invention. This is also a cage-free solution where the bearing openings are let into a guiding elevated portion 211, which only has a lateral ramp 213 via which the bearing cones 56 are inserted. For a practical configuration it is possible here for a blade 51 of the impeller 50, here the blade 51 which is oriented in the longitudinal direction of the discharge pipe 13, to be secured by pincers and fitted into the pipe 13 in the position illustrated in FIG. 7 if in the process the measuring pipe to be mounted is deformed selectively with an external force. In addition, FIG. 7 shows clearly that there is a small step 24 on the rear wall 15, with the result that the main jet direction which is predefined by the constriction 14 impacts centrally on the impact face 54. In this alternative solution, the cone would also have to be somewhat longer.

Figure 8:
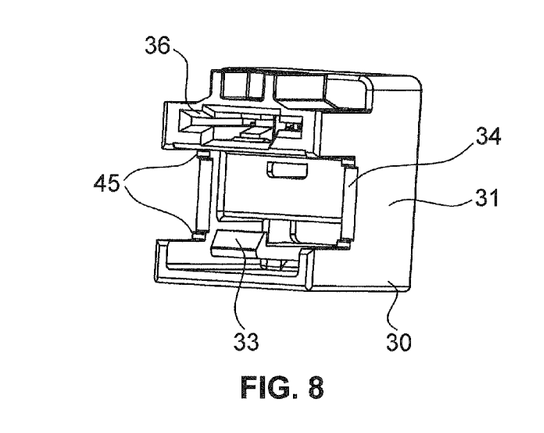
FIG. 8 shows a perspective view of the sensor housing of the flowmeter according to FIG. 1.
Figure 9:
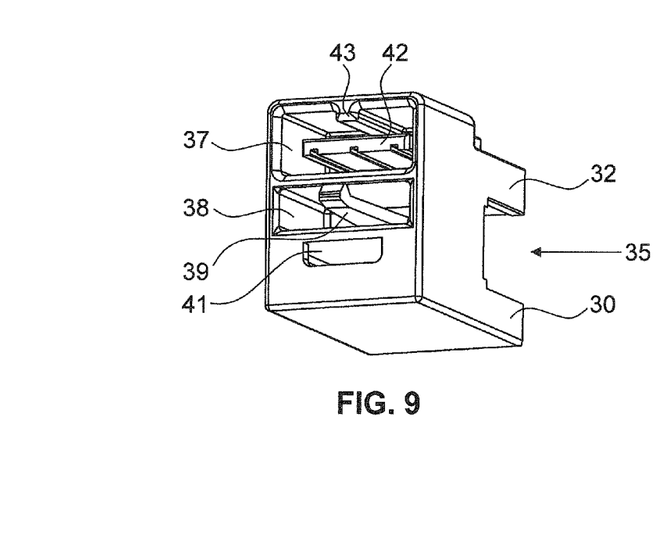
FIG. 9 shows a further perspective view of the sensor housing according to FIG. 8.

FIGS. 8 and 9 show a perspective view of the sensor housing 30. FIG. 8 clearly shows the receptacle 35 with the receptacle rear wall 34, in which this receptacle rear wall 34 comprises two separate fins which are formed by the end edges of the side walls 31 and 32. At the same time, the receptacle 35 has an upper and lower boundary, against which boundaries upper sides 22 or the front or rear side 23 of the discharge pipe 11, which can be seen in FIG. 10, abut. As a result of the steps 45 provided on the receptacle rear wall 34, there results, through interaction with the locking tongue 33, a pull-off securing means and, if appropriate, a clamping means of the discharge pipe 11 in the sensor housing 30.

The equipping of the housing 30, to be performed from this side, with the Hall sensor 90 is shown by the reference symbol 36. On the opposite rear side of the sensor housing 30, the corresponding plug receptacle 37 can be seen, where electrical contact of the line guide with the Hall sensor contacts is then made. The guide fin 43 ensures correct plugging of the plug into the opening 37.

The connecting receptacle 38 contains a locking tongue 39 which protrudes beyond the rear side of the sensor housing 30, in order to mount the plug housing in a device which requires the flowmeter. A further opening is shown by the reference symbol 36, which opening is a demolding clearance region for the locking tongue 33 in the injection molding process.

Figure 10:
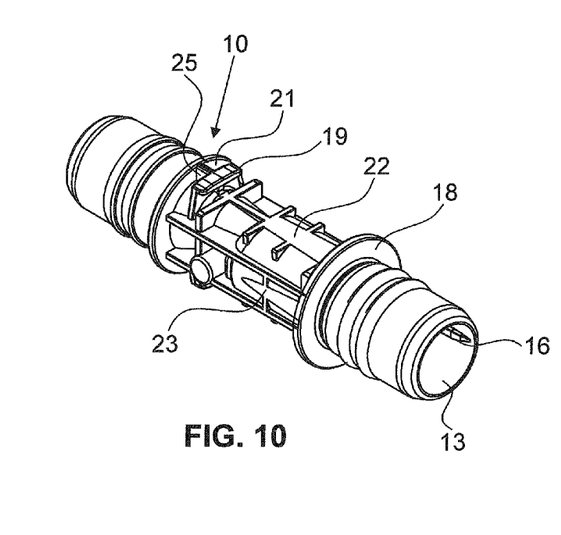
FIG. 10 shows a perspective view of the measuring housing of the flowmeter according to FIG. 1.

Finally, FIG. 10 shows a perspective view of the measuring housing 10 of the flowmeter according to FIG. 1. It is to be noted here that the opposing flanges 19 are two non-circular flanges, such as the flange 18, and that the orientation groove 21 is additionally provided with a bridge 25 in order to ensure the correction installation of the measuring housing in the sensor housing 30. In order therefore to detect the position of the measuring pipe 10 in the automation of the assembly, the flange is enlarged. The web 25 is then used to detect the position of the constriction/nozzle additionally with respect to the rotation, which web 25 can be detected with an optical sensor during assembly if the device has been installed shifted through 180°.

The difference between the exemplary embodiments with the bearing cage 60 or without the bearing cage 60 can be summarized as follows. In an exemplary embodiment without a bearing cage 60, the measuring pipe 11 of the measuring cage 10 or 110 is deformed in such a way that the bearing point is enlarged, with the result that the impeller 50 or 150 can be mounted. As soon as the impeller 50 or 150 is at the assembly position and the bearing cone 56 lies on both sides in the bearing points 166, this deformation is reversed again, which can be realized through simple removal of the force and elastic deformation.

On the other hand, when the bearing cage is used, the impeller 50 is firstly mounted in this bearing cage 60 and subsequently fitted into the pipe 11 from the discharge side 13. The axial assembly takes place here by means of the four catches 17. It is also in principle possible to provide only two catches 17. A sprung part, which is realized with the half-round grooves 68, is provided on the bearing cage 60 itself for fitting in via the four catches 17. The rotational position itself, that is to say the positioning of the impeller with the correct orientation, is defined by means of the lateral webs which correspond to grooves in the bearing cage 60.

The measuring pipe 11 has the said constriction 14 as a nozzle on the supply pipe side 12, with which nozzle the measuring range is defined. Various nozzle diameters bring about changes in the flow speed of the throughflow liquids. In addition, the device can be adapted to a change in the flow speed to be measured.

The rotating magnetic field in the case of the rotating impeller 50 is detected by a Hall effect sensor which is fitted into the opening 36 in the housing 30. Here, in addition to the presented plug solution, with the opposing plug in direct contact on the connection of the Hall effect sensor, it is also possible to provide a cable or direct mounting of the printed circuit board. The separation between the housing 30 and the pipe 10 serves additionally as a double insulation layer.

In order to keep the contact point of the bearing of the impeller 50 at the smallest possible diameter, preferably two different cone angles are used. In the case of the bearing journal, the angle of the cone 56 with respect to the rotational axis is, for example 40°, whereas the bearing shell, formed by the bearing opening 66, has a simple angle with respect to the rotational axis of 45°.

When a magnet 160 enclosed by injection molding is used in the case of the impeller 150, only one pair of magnet poles is used. This makes it possible to limit the pulse number, which in the case of the size of a model specimen with the dimensions mentioned in the exemplary embodiment gives rise to a throughflow rate of approximately one liter per minute and 22'200 pulses as the order of magnitude.

The pipes 10, 110, housing 30 and bearing cage 60 are advantageously injection molded parts, if appropriate made of a permanently magnetic material in the case of the impeller.

The diameter of the impeller 50 is somewhat smaller than the inner diameter of the discharge pipe 13 into which it is inserted. In this context, the feature diameter of the impeller 50 means that the impeller 50 has, when viewed radially over outer faces 52 which respectively lie opposite one another, a diameter measured in this way, or this diameter is determined by the distance between the faces 152. In this context, the circumcircle diameter of the impeller 50 is smaller than the inner diameter, or each inner diameter, of the discharge pipe 13. This circumcircle diameter defines the outer diameter corresponding to the impeller 50, even between the faces 52-52 and 152-152 lying opposite one another through the hub. Said circumcircle diameter is smaller than the nominal inner diameter of the discharge pipe 13, which means two things. On the one hand, the nominal diameter is the diameter of the discharge pipe 13 (or see below: of the supply pipe 12) which this pipe has over a substantial part. In this context, the inserts such as the bearing cage 60 etc. are not considered. As a result of this relatively large nominal diameter, the impeller 50 can be fitted into the measuring housing via this path, which provides advantages in respect of the tightness and the termination with respect to the sensor housing 30.

Since, in particular, the supply pipe 12 advantageously has a diameter which is similar to or the same as the discharge pipe 13, the diameter of the impeller 50 is also smaller than the inner diameter of the supply pipe 12. It is therefore possible to specify a single-piece supply pipe/discharge pipe 12/13, as illustrated in section in FIG. 6, which has essentially a cylindrical outer shape, as illustrated in FIG. 10, which is interrupted merely by connecting fins and connecting flanges, and an identical outer diameter is provided onto which the connecting hoses (not illustrated) can be fitted. There is, in particular, no measuring housing 110 protruding beyond the diameter, as defined above, of the impeller 50. This results in a reduced space requirement for the measuring housing 110 in contrast to the designs in the prior art. This measuring housing 110 can then be fitted laterally into a recess 35 in the sensor housing 30 and locked and, in particular, clipped in, which permits very simple and space-saving routing of the hose which then surrounds the sensor and leads in and out, with the measuring housing 110 located between them.

Figures 11, 12, 13:
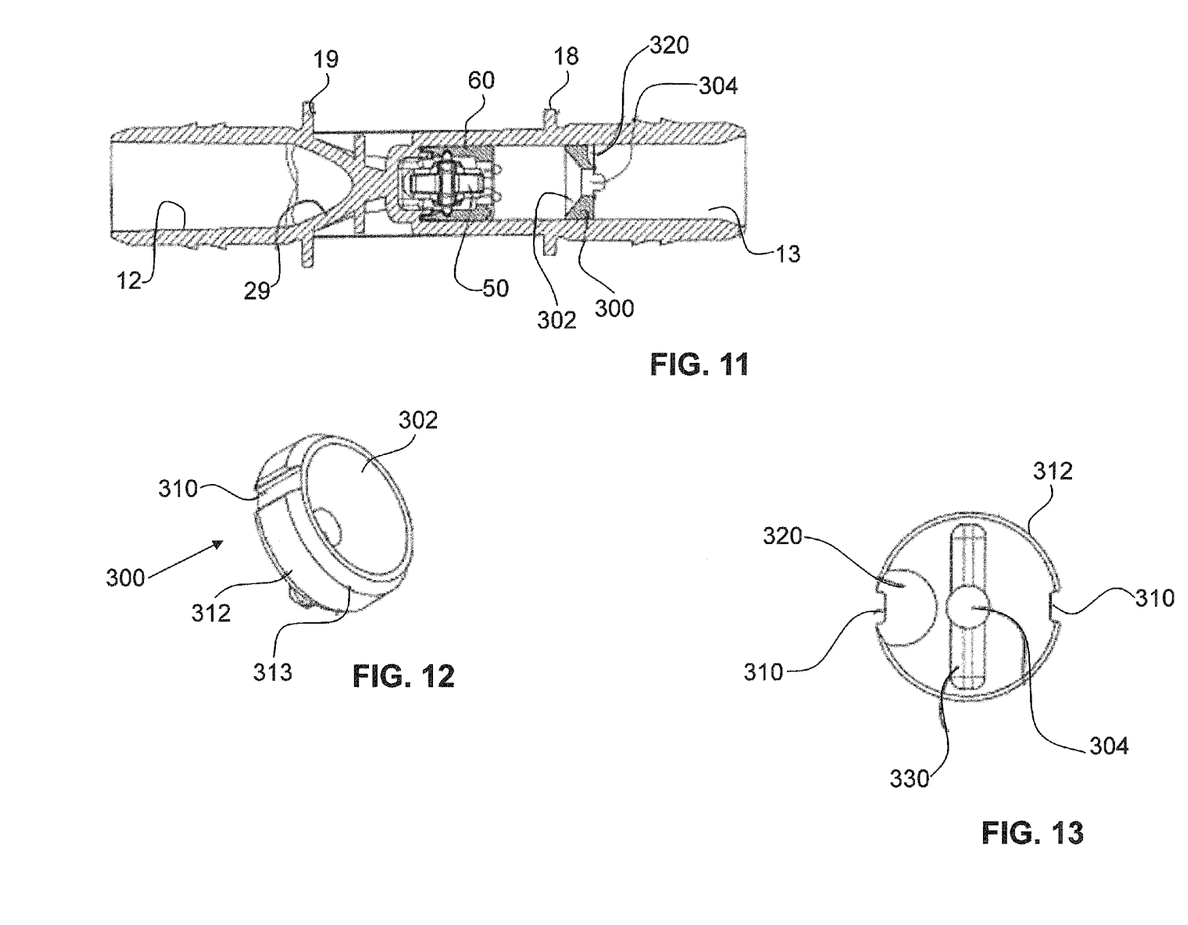
FIG. 11 shows a cross section through a measuring housing having a throughflow restrictor inserted into the discharge pipe.
FIG. 12 shows a perspective view of the throughflow restrictor from FIG. 11.
FIG. 13 shows a plan view of the throughflow restrictor from FIG. 11.

FIG. 11 shows a cross section through an exemplary embodiment of a measuring housing 10 with an impeller 50, wherein a throughflow restrictor 300 is inserted into the discharge pipe 13 itself. FIG. 12 shows a perspective view of the throughflow restrictor 13 from FIG. 11, and FIG. 13 shows a plan view thereof.

The throughflow restrictor 300 has, on its side facing the impeller 50, a reducing cone 302 which reduces the diameter of the inner pipe of the discharge pipe 13 to the size of the throughflow opening 304. The size of the throughflow opening 304 is of the order of magnitude of the opening remaining on the supply pipe side 12 downstream of the reducing cone 29 there. The measuring range of the measuring device is defined with the constriction 14 there as a nozzle. On this side, the measuring accuracy is increased by avoiding rebound effects as a result of the pump action.

Figure 14:
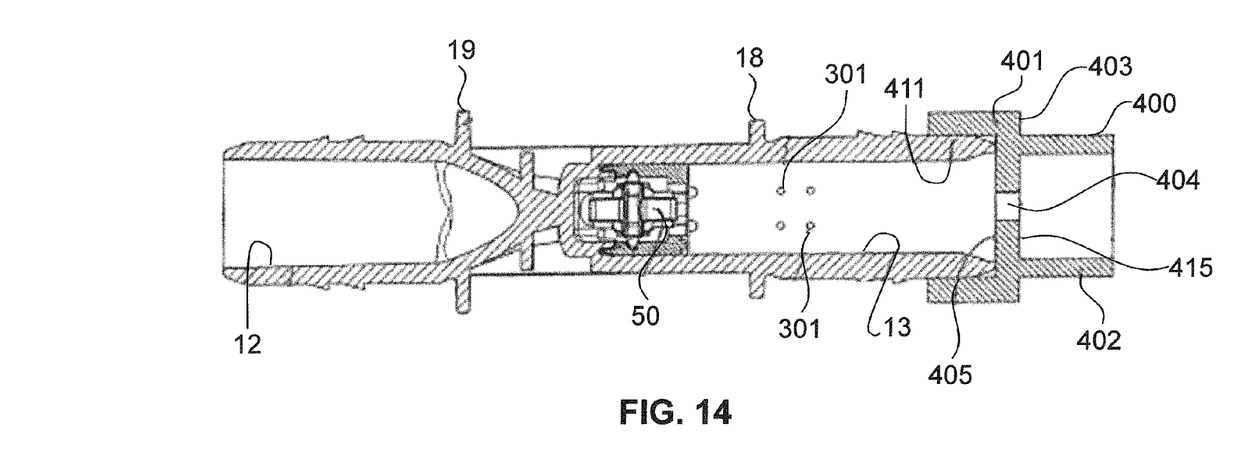
FIG. 14 shows a cross section through a measuring housing having a throughflow restrictor fitted onto the discharge pipe.

Reference is briefly made to FIG. 14, which shows four of the total of eight positioning knobs 301 in cross section, on which positioning knobs 301 the throughflow restrictor is attached. In this context, the throughflow restrictor 300 is secured axially in the pipe by means of radial pressure and by means of the knobs 301.

The throughflow restrictor 300 has a perimeter wall 312 which is tailored in a closely fitting fashion to the inner diameter of the discharge pipe 13. Said perimeter wall 312 has two grooves 310 lying opposite one another for receiving the locking elements. For the sake of simpler insertion into the discharge pipe 13, the perimeter wall 312 is beveled at least at the insertion side 313. On the side pointing towards the discharge, a depression 320 which extends laterally with respect to the groove 310 is provided, said depression 320 being in the illustrated exemplary embodiment here an injection point of the injection molded part. A fin 330, which facilitates handling of the throughflow restrictor 300 by engagement by means of a pincer-shaped object for insertion into the discharge pipe 13 is provided radially with respect to the throughflow opening 304.

Figure 15:
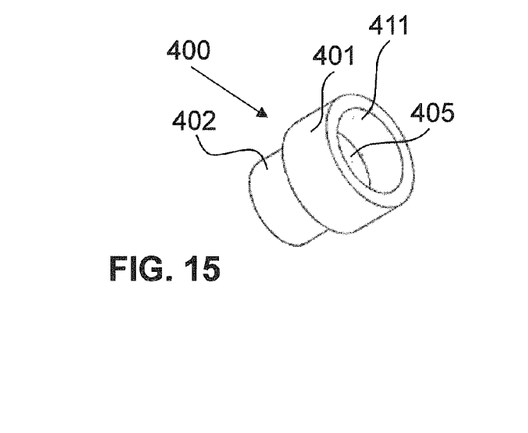
FIG. 15 shows a perspective view of the throughflow restrictor from FIG. 15.

FIG. 14 shows another exemplary embodiment for assembling a throughflow restrictor 400 on the outside of the discharge pipe 13. FIG. 15 shows the throughflow restrictor 400 in the perspective view, and FIG. 16 in a plan view from the discharge side.

Figure 16:
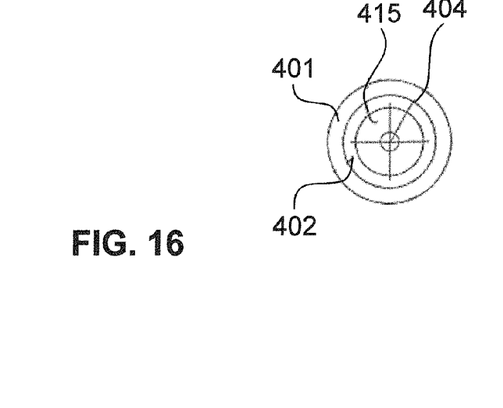
FIG. 16 shows a plan view of the throughflow restrictor from FIG. 16.

The throughflow restrictor 400 also has a continuous passage opening 404 similar to the abovementioned throughflow opening 303. Said passage opening 404 is arranged, in particular centrally, in a wall which connects two sleeves 401 and 402 which adjoin one another and are connected in one piece, to the two side faces 405 and 415 which adjoin the diameter. The wall 405/415 is continuous on the discharge side in the advantageously relatively narrow discharge-side sleeve 402 which can have, in particular, the diameter similar to the discharge pipe 13. Here, the wall which has the throughflow opening 404 is, on both sides, a flat side face, which follows the radius, in contrast to the cone 302 on the inside of the throughflow restrictor 300. It is possible, even in the case of the throughflow restrictor 300, to have a smooth, supply-side wall, and a cone in this exemplary embodiment.

On the discharge side, a tubular sleeve 401 is provided which is larger in the inner diameter and which sits, in particular with a force fit on the outer wall of the discharge pipe 13. In this context, the discharge pipe 13 abuts against the inner wall 405, said inner wall 405 forming a shoulder. Provided between the two sleeves 401 and 402 is a shoulder 403 which, however, could also be implemented by a junction. The discharge pipe is seated on the inner wall 411 of the sleeve 401 under stress.

The throughflow restrictor 300 or 400 is arranged on the discharge side, and the impeller 50 is therefore bounded on both sides by a constriction 14 or 304/404. At the location on the supply side where the nozzle 14 defines the measuring range, the constriction 304/404 improves the measurement, since usually when these flowmeters are used the device which pumps the liquid is, as it were, arranged downstream as suction points. This pump operates generally with a certain clocking method which generates a different partial vacuum on the discharge side of the measuring device. This change in partial vacuum can bring about falsification of the measurement result. This influence is reduced by inserting the throughflow restrictor 300/400 on the discharge side, in particular because the constriction 14 which determines the throughflow corresponds, as a nozzle which is oriented toward the impeller 50, to the discharge diameter through the constriction 304/404.

The element 300 or 400 has been referred to as a throughflow restrictor. It generates a pressure loss at the outlet and therefore a reduced throughflow through its constriction 304 or 404. The diameter of the opening of the throughflow restrictor is larger than or at least of the order of magnitude of its length in the direction of the pipe. The pump which is located downstream thereof can, however, compensate this pressure loss; the flowmeter is, of course, installed on the suction side of the pump.

| LIST OF REFERENCE NUMBERS | |
|---|---|
| 10 | Measuring housing |
| 11 | Outer pipe |
| 12 | Supply pipe |
| 13 | Discharge pipe |
| 14 | Constriction |
| 15 | Rear wall of constriction |
| 16 | Positioning fin |
| 17 | Ratchet pawl |
| 18 | Flange |
| 19 | Opposing flange |
| 21 | Orientation groove |
| 22 | Upper side |
| 23 | Front side/rear side |
| 29 | Reducing cone |
| 30 | Sensor housing |
| 31 | Side wall |
| 32 | Side wall |
| 33 | Locking tongue |
| 34 | Receptacle rear wall |
| 35 | Receptacle |
| 36 | Sensor receptacle |
| 37 | Plug receptacle |
| 38 | Connecting receptacle |
| 39 | Locking tongue |
| 41 | Deformation clearance region |
| 42 | Line guide |
| 43 | Guide fin |
| 50 | Impeller |
| 51 | Blade |
| 52 | Outer face |
| 53 | Beveled face |
| 54 | Impact face |
| 55 | Side wall |
| 56 | Bearing cone |
| 57 | Widened cone base |
| 58 | Round cone tip |

-continued

LIST OF REFERENCE NUMBERS

| | |
|---|---|
| 60 | Bearing cage |
| 61 | Ring |
| 62 | Bearing arm |
| 63 | Bearing arm groove |
| 64 | Run-up projection |
| 65 | Guiding groove |
| 66 | Bearing opening |
| 67 | Oval breakthrough |
| 68 | Sprung part |
| 69 | Outer wall |
| 90 | Hall sensor |
| 110 | Measuring housing |
| 111 | Guide fin |
| 112 | Guide groove |
| 113 | Ramp |
| 150 | Impeller |
| 151 | Blade |
| 152 | Outer face |
| 153 | Casting depression |
| 160 | Magnet |
| 161 | Lateral injection-molding enclosure |
| 166 | Bearing opening |
| 210 | Measuring housing |
| 211 | Guiding elevated portion |
| 213 | Ramp |
| 300 | Throughflow restrictor |
| 301 | Knob |
| 302 | Reducing cone |
| 304 | Through-opening |
| 310 | Securing groove |
| 312 | Perimeter wall |
| 313 | Beveled portion |
| 320 | Depression |
| 330 | Fin |
| 400 | Throughflow restrictor |
| 401 | Pipe-side sleeve |
| 402 | Discharge-side sleeve |
| 403 | Shoulder |
| 404 | Through-opening |
| 405 | Inner shoulder |
| 411 | Inner wall |
| 415 | Inner shoulder |

The invention claimed is:

1. A flowmeter for liquids, having a measuring housing which encloses and rotatably mounts an impeller, a supply pipe, a discharge pipe, at least one sensor encoder which is assigned to the impeller, and a flow sensor which is provided on the measuring housing, responds to the sensor encoder and determines the amount of fluid flowing through the measuring housing, on the basis of the revolutions of the impeller,
wherein the measuring housing is a pipe which comprises the supply pipe and the discharge pipe in one piece, wherein a nozzle-forming constriction is arranged eccentrically in the measuring housing between the supply pipe and the discharge pipe, in that the impeller is rotatably mounted in the discharge pipe downstream of the nozzle-forming constriction, and in that the outer diameter corresponding to the impeller is smaller than the nominal inner diameter of the discharge pipe,
wherein the impeller has in the plan view in the axial pipe direction an outer face in each rotational position, such that the impeller fits into the free space provided by the inner pipe, and wherein the impeller has two side walls, on each of which a bearing element is provided axially in the center, said bearing element being assigned to a rotary bearing which is assigned to the discharge pipe.

2. The flowmeter as claimed in claim 1, wherein the bearing element is in each case a bearing cone, and in that the rotary bearings are provided in or in front of the wall of the discharge pipe.

3. The flowmeter as claimed in claim 1, wherein at least one positioning fin is provided in the discharge pipe onto which the at least one positioning fin a bearing cage for the impeller is fitted.

4. The flowmeter as claimed in claim 3, wherein at least two ratchet pawls for securing the bearing cage in its axial position are provided.

5. The flowmeter as claimed in claim 3, wherein the bearing cage has bearing arms which lie opposite one another and in which the bearings are provided.

6. The flowmeter as claimed in claim 1, wherein the impeller has three or four blades.

7. The flowmeter as claimed in claim 1, wherein the impeller is an injection molded part wherein it is composed of a permanently magnetic injection molded plastic, at least in the blades.

8. The flowmeter as claimed in claim 1, wherein the impeller is an injection molded part, wherein at least one blade has a permanent magnet which is at least partially enclosed by injection molding.

9. A flowmeter for liquids, having a measuring housing which encloses and rotatably mounts an impeller, a supply pipe, a discharge pipe, at least one sensor encoder which is assigned to the impeller and a flow sensor which is provided on the measuring housing, responds to the sensor encoder, and determines the amount of fluid flowing through the measuring housing, on the basis of the revolutions of the impeller,
wherein the measuring housing is a pipe which comprises the supply pipe and the discharge pipe in one piece, wherein a nozzle-forming constriction is arranged eccentrically in the measuring housing between the supply pipe and the discharge pipe, in that the impeller is rotatably mounted in the discharge pipe downstream of the nozzle-forming constriction, and in that the outer diameter corresponding to the impeller is smaller than the nominal inner diameter of the discharge pipe, and wherein the flow sensor comprises a Hall sensor or Reed switch.

10. The flowmeter as claimed in claim 1, wherein the outer diameter corresponding to the impeller is smaller than the nominal inner diameter of the discharge pipe.

11. A flowmeter for liquids, having a measuring housing which encloses and rotatably mounts an impeller, a supply pipe, a discharge pipe, at least one sensor encoder which is assigned to the impeller, and a flow sensor which is provided on the measuring housing, responds to the sensor encoder, and determines the amount of fluid flowing through the measuring housing, on the basis of the revolutions of the impeller,
wherein the measuring housing is a pipe which comprises the supply pipe and the discharge pipe in one piece, wherein a nozzle-forming constriction is arranged eccentrically in the measuring housing between the supply pipe and the discharge pipe, in that the impeller is rotatably mounted in the discharge pipe downstream of the nozzle-forming constriction, and in that the outer diameter corresponding to the impeller is smaller than the nominal inner diameter of the discharge pipe,
wherein on the discharge side a throughflow restrictor is provided which has a throughflow opening on the order of magnitude of the nozzle-forming constriction in the inflow pipe, and
wherein the throughflow restrictor is an insert which is engaged in the discharge pipe or an attachment which is fitted onto the discharge pipe.

12. The flowmeter as claimed in claim 4, wherein the bearing cage has bearing arms which lie opposite one another and in which the bearings are provided.

13. The flowmeter as claimed in claim 1, wherein two positioning fins are provided in the discharge pipe onto which the positioning fins a bearing cage for the impeller is fitted.

* * * * *